(12) United States Patent
Nishioka et al.

(10) Patent No.: US 6,237,441 B1
(45) Date of Patent: May 29, 2001

(54) COMBINATION OF SHIM AND CAM

(75) Inventors: Takao Nishioka; Yasushi Mochida, both of Hyogo (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/341,513

(22) PCT Filed: Mar. 15, 1999

(86) PCT No.: PCT/JP99/01240

§ 371 Date: Jul. 13, 1999

§ 102(e) Date: Jul. 13, 1999

(87) PCT Pub. No.: WO99/47810

PCT Pub. Date: Sep. 23, 1999

(30) Foreign Application Priority Data

Mar. 19, 1998 (JP) .................................................. 10-070466
Apr. 10, 1998 (JP) .................................................. 10-099194

(51) Int. Cl.[7] .............................. F16H 53/06; F04B 9/04
(52) U.S. Cl. ........................................... 74/569; 123/90.51
(58) Field of Search ................... 74/567, 569; 123/446, 123/456, 90.51

(56) References Cited

U.S. PATENT DOCUMENTS 5,261,366 * 11/1993 Regueiro ............................. 123/299
5,372,099 * 12/1994 Matsunuma et al. .............. 74/569 X
5,647,313 * 7/1997 Izumida et al. .................... 123/90.51

FOREIGN PATENT DOCUMENTS

| | | |
|---|---|---|
| 63-289306 | 11/1988 | (JP) . |
| 5-340213 | 12/1993 | (JP) . |
| 6-2511 | 1/1994 | (JP) . |
| 6-137404 | 5/1994 | (JP) . |
| 7-54965 * | 2/1995 | (JP) . |
| 7-98052 | 4/1995 | (JP) . |
| 7-35778 | 7/1995 | (JP) . |
| 8-226311 | 9/1996 | (JP) . |
| 11-280419 * | 10/1999 | (JP) . |

* cited by examiner

Primary Examiner—Richard M. Lorence
(74) Attorney, Agent, or Firm—McDermott, Will & Emery

(57) ABSTRACT

An object of this invention is to provide a combination of a shim and a cam for use in a reciprocating mechanical system operated under a severe sliding condition, the combination not only assuring an excellent sliding characteristic by reducing friction work during sliding but also providing a high wear resistance and a high fatigue characteristic.

In this combination of the shim and cam, the surface roughness of the sliding surface between the shim surface and cam is 0.08–0.4 $\mu$m in terms of ten-point average surface roughness Rz and the surface hardness of the shim sliding portion is higher than that of the cam and the cam has a plurality of cam mountains.

9 Claims, 8 Drawing Sheets

CASE OF LOOSE FIT

CASE OF CAULKING

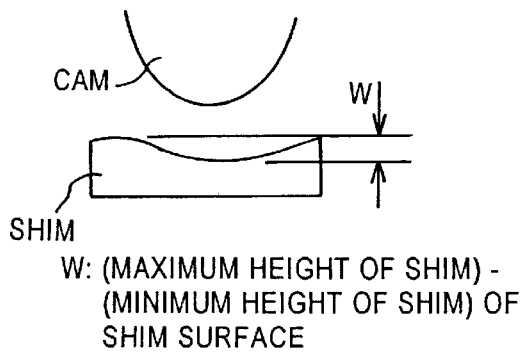
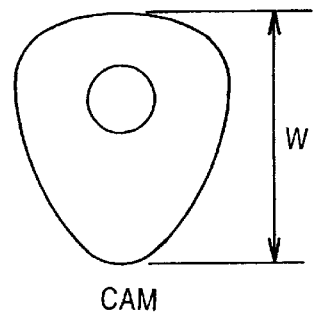
FIG. 8a  FIG. 8b
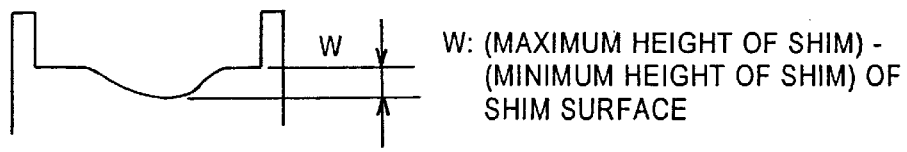
FIG. 9

COMBINATION OF SHIM AND CAM

TECHNICAL FIELD

The present invention relates to a combination of a shim and cam which are used in a reciprocating mechanical system of a fuel pressure feed pump driving system of an automobile engine and in which reduction of wear amount and improvement of fatigue characteristic are achieved at a low cost. This combination is effective for improvement of the durability of the mechanical parts and maintenance of the stabilization of the pump performance.

BACKGROUND ART

Recently, in order to improve fuel efficiency of the automobile internal combustion engine from standpoints of global environment problem, development of a fuel direct injection engine which injects gasoline or light oil directly into a combustion chamber has been carried out aggressively. In the fuel injection pump for use in such an engine, a reciprocating system employing a cam to obtain a fuel feeding pressure is used. A combination of a cam and a cam follower (cam roller, tappet and the like) for use here is one of sliding components operated under a very severe condition. Improvement of the fatigue characteristic and the wear resistance and reduction of a wear loss are very effective means for not only maintaining the performance of the fuel pump and intensifying the durability thereof, but also for improving the efficiency of the-entire engine.

For the reason, Japanese Patent Application Laid-Open No. HEI5-340213 has disclosed a trial in which TiN coating film of $R_z$ 0.02–0.5 μm in terms of surface roughness is provided on a shim sliding surface opposing a cam of an operating valve train so as to reduce wear loss of both. This surface hardening film has a thickness of about 0.5–10 μm.

According to this published document, because when the shim surface coated with TiN slides relative to the cam surface, the cam surface is ground by the shim surface, then the surface does not have to be ground at a high accuracy preliminarily.

In this case, the sliding surface relative to the cam is made of chilled alloy iron and it is finished to about 3.2 μm in terms of the surface roughness.

Further, Japanese Patent Application Laid-Open No.HEI6-2511 has disclosed a structure of a shim in which the surface roughness of a contact surface relative to the cam is $R_z$ 0.2–0.7 μm for the same object and the same purpose with the publication described above. Japanese Patent Application Laid-Open No.HEI6-137404 has disclosed a shim composed of high hardness ceramics whose surface is finished in the same way.

The cam driving mechanism disclosed in any publication is applied to a single-mountain (one convex curved surface) type. Such a type of the fuel pump cam driving mechanism is suitably applicable to a vehicle having a sufficient capacity in engine cylinder number and space like a large-size diesel commercial vehicle and cannot be used for a vehicle having a fuel pump to which this type cannot be applied unless any modification is carried out.

There is a need for reducing an entire volume and weight of an engine in an engine which injects gasoline directly (hereinafter this direct injection may be referred to as direct injection, but this is the same meaning) for a small passenger vehicle or a fuel pump for diesel direct injection engine. Therefore, for the reciprocating mechanical parts, reduction of weight and cost by reducing the number of necessary parts and volume or the like and conversion from the rolling friction type through cam and cam roller composed of mainly steel material to sliding friction type of the cam and shim (FIG. 1) have been urgently demanded. Further, this kind of the fuel pump has no capacity for mounting a large-size, large-weight pump containing the same number of the fuel compression mechanisms as that of engine cylinders, unlike, for example, a large-size in-line fuel pump for diesel vehicle. Therefore, usually as shown in FIG. 1, a single cylinder fuel compression mechanism containing a plurality of cam mountains is constructed and fuel is pressure fed to each cylinder of the engine. In such a mechanism, a cam roller (hereinafter referred to as roller) made of metallic material has been used as mainly a cam follower. However, in this system, a tangent line between the sliding surface of the cam and the roller during sliding becomes very complicated. Therefore, it is necessary to make the roller and cam in a rolling contact without generating a large relative sliding amount in a sliding portion between the roller and cam. Therefore, the sliding surface of the cam becomes complicated. As a result, it takes long to process the cam thereby leading to increase of production cost. Particularly if the relative sliding amount is large, this leads to an abnormal wear of the cam. If the sliding surface shape of the cam is changed due to this wear, fuel injection timing, injection amount and the like change. This is fatal to the engine. On the other hand, in case of sliding between a cam having plural cam mountains and a shim, a complicated shape design for the sliding surface for smoothing the tangent lines of the cam and shim is not necessary. However, reduction of the friction between the cam and shim and suppression of the friction amount when the abovementioned rolling friction is changed to the sliding friction have been a prominent problem. Additionally, particularly in a gasoline direct injection engine, a cam shaft for fixing the cam is fixed directly to a cam shaft of the engine in most cases. Thus, reciprocations of the same number as a frequency multiplied by the number of cam mountains occur in the reciprocating mechanism for use in the operating valve train of the engine. Therefore, tremendous improvements in the wear resistance and fatigue resistance (pitching fatigue and the like) of the shim are necessary.

In case where the cam is fixed directly to the cam shaft of the engine, the sliding portions of the plunger for pressure feeding and holder shown in FIG. 1 are assembled together at an extremely high precision to suppress fuel leak. Therefore, in case where the shim is mounted directly on the end portion of the plunger, it is necessary to adjust the assembly precision for the cam to suppress a single-side contact with the shim and make uniform the contact portion. Therefore, conventionally, in the roller mechanism and shim mechanism shown in FIG. 1, as shown in FIG. 2 the lifter and lifter shim for reciprocating the plunger are disposed as a different part. In this case, in case where the cam mounting accuracy is adjusted by a clearance between the lifter and lifter guide (same FIG. a) or in case where the cam is mounted directly onto the plunger (same FIG. b), as shown in FIG. 3 the sliding surface relative to the cam is provided with a smooth, spherical crowning shape so as to carry out this adjustment depending on the case.

In these cases, additional parts are necessary or machining for providing the sliding surface of a high hardness material for use in the shim with a smooth, spherical shape is necessary. Therefore, this may lead to increase of production cost. A method for providing with the crowning shape without such machining has been disclosed in, for example, Japanese Patent Application Laid-Open No. SH063-289306.

According to this publication, a ceramic member having a smooth surface is fit to a metallic part and the ceramic member is deformed by a stress generated by that fitting work so as to provide with the crowning shape. However, according to this method, an additional part for that fitting is necessary or it is difficult to obtain a high accuracy crowning shape.

The above-mentioned problem is noticed in only a combination of a shim and a cam having a plurality of cam mountains and therefore, no noticeable problem has been produced in an ordinary single-mountain cam. That is, although the single-mountain cam mechanism is used in the operating valve system and the like of the gasoline engine, by using a conventional steel made shim, no noticeable problem exists regarding its wear resistance and durability.

As regards the friction work by sliding, considering a use condition under an existence of lubricating material like lubricant, generally a minimum gap between opposing sliding parts, minimum oil film thickness and characteristic of the sliding surface of the sliding part largely affect the sliding characteristic and frictional loss. Generally, the friction work in the above-described sliding is expressed by a following formula.

$$F = A\{\alpha Sm + (1-\alpha)St\} \quad \text{(Formula 1)}$$

Where F is friction work, A is sliding area, $\alpha$ is breaking area ratio of oil film, Sm is shearing strength in a case where an opposing sliding member is in a solid contact, St is shearing strength of oil film and $\alpha$Sm is friction work of a case where no oil film exists (friction work under boundary lubrication) and $(1-\alpha)$St is friction work of a case where oil film exists (friction work under a complete fluid lubrication). Because Sm is larger than St, it is necessary to increase the item of the friction work under a complete fluid lubrication to reduce the friction work F and that is, it is necessary to reduce $\alpha$.

On the other hand, it is important to control the characteristic of the sliding surface of the opposing sliding part in order to provide the sliding portion with this complete fluid lubrication. For example, in column number (0004) of Japanese Patent Application Laid-Open No.HEI7-98052, an oil film parameter indicating a scale of lubrication is indicated in the following formula (2), this formula indicates that increasing this value is effective for provision of the complete fluid lubricating condition. Further, the publication disclose that at the same time, decreasing the surface roughness of two opposing sliding surfaces is also effective for decreasing the friction work.

$$\Lambda = h_{min}/\sqrt{(R_{rms1}^2 + R_{rms2}^2)} \quad \text{(Formula 2)}$$

Where hmin is a minimum gap between the opposing sliding parts or a minimum oil film thickness, Rrms1 is square average roughness of a sliding part surface and Rrms2 is square average roughness of the other sliding part surface.

DISCLOSURE OF THE INVENTION

In views of the above described problems, an object of the present invention is to provide a shim which is used as a reciprocating mechanical part under a severe sliding condition, the shim having a high wear resistance and a high fatigue resistance upon sliding, and more particularly to a shim provided with a mechanism for preventing a single side contact with the cam and making uniform the contact surface at a lower cost.

To achieve the above object, in the combination of the shim and cam provided by the present invention, the cam has a plurality of cam mountains and the hardness of the sliding surface of the shim with the cam is higher than that of the cam surface. The surface roughness of the cam of the same mechanical part and a surface thereof sliding relative to the other part is 0.07 μm–0.4 μm in terms of ten-point average surface roughness Rz. The contact surface of the shim surface relative to other part than the cam is flat or convex-shaped spherical face (crowning). The examples are shown in FIGS. 4 and 13. The crowning refers to a convex-shaped spherical face in contact with the plunger of the shim in FIG. 5 indicating a sectional view of the same mechanical portion. The maximum height of the crowning described later is a dimension indicated in FIG. 3 or FIG. 4.

Because the hardness of the shim surface is higher than that of the sliding surface of a mating cam, this is effective for reducing the wear amount of the cam and shim.

The surface hardness of the sliding surface of the shim and cam is desired to be higher than or equal to 1000 in terms of Vickers hardness. As a result, in case of sliding through a plural-mountain cam, improvement of wear resistance and fatigue characteristic is remarkable. In the shim surface which is smoothed by finishing work, the deterioration of the surface roughness can be suppressed by solid contact with the cam.

Finishing the shim surface roughness to less than or equal to 0.4 μm in terms of ten-point average surface roughness Rz is effective for increasing the oil film parameter $\Lambda$ in the aforementioned formula (2). Because the hardness of the shim surface is higher than that of the sliding surface of a corresponding cam, if the surface roughness exceeds 0.4 μm, the corresponding cam is attacked or worn. As a result, the cam shape is changed. This changes an injection timing or the like of the pump, which is not desirable. obtaining a smooth surface of less than 0.07 μm only takes labor and time and does not improve the above effect, which is not favorable in economic viewpoints.

Another reason why the surface roughness of the shim side is improved is that finishing by machining such as grinding, lapping, polishing and the like can be carried out relatively easily because it has no complicated curved shape unlike the sliding surface of the cam.

In the shim of the present invention, a surface thereof in contact with a sliding part other than the cam like a lifter on which the shim is mounted is flat or a convex-shaped spherical face (crowning). In the former case, as shown in FIG. 3 for example, to adjust a contact between the sliding surfaces of the shim and cam appropriately, the sliding surface between the shim and cam is provided with a smooth spherical shape (crowning) of 0.07–0.4 μm in terms of surface roughness Rz depending on the case. On the other hand, in the latter case, as shown in FIGS. 4–5, the surface of some kind of a shim which is in contact with for example, a lifter or plunger on which the shim is to be mounted is of convex-shaped spherical shape (crowning). Consequently, the shim does not slide with a large relative velocity with respect to that mounting surface. Therefore, it is not necessary to finish to a highly smooth surface as shown in FIG. 3, which is economically advantageous. In this case, because a contact between the sliding surfaces of the shim and cam is adjusted appropriately, the contact pressure can be reduced. Thus, the ceramic coating film of CrN, TiN or the like, DLC coating film can be used for the sliding surfaces of the shim and cam without being accompanied by film separation.

On the other hand, in the latter case, as a preferable shape of the shim, the flatness of the sliding surface relative to the cam is less than or equal to 0.5 µm–5 µm and the maximum height of the crowning of a contact surface relative to a mounting part such as a lifter, on which it is mounted and which is in contact with it is preferably 5 µm–50 µm. The reason why the flatness of the sliding surface relative to the cam is less than or equal to 5 µm is to increase the parameter Λ in the aforementioned formula (2). A further reason is that if the flatness exceeds 5 µm, ununiformity is likely to occur in a contact with the cam. Finishing to less than 0.5 µm may lead to increase of production cost. In this case, the crowning height of the contact surface is defined as shown in FIG. 4. If it exceeds 50 µm, it takes labor and time for machining to provide with the convex-shaped spherical shape, which is economically disadvantageous. If it is less than 5 µm, the function for adjusting the single side contact and full contact becomes insufficient so that eccentric abrasion is likely to occur in the cam.

Further, the surface roughness of the convex spherical face of the shim which is in sliding contact with a part on which the shim is mounted is preferably between 0.6 µm and 6.4 µm in terms of surface roughness $R_z$. The lower limit for machining for providing the convex spherical face is preferably 0.6 µm in economic viewpoints and if 6.4 µm is exceeded, attacking to a mating member on which the shim is to be mounted becomes high so that the wear amount of the mating member is likely to increase.

Further, some kind of the shim of the present invention is made of ceramics. By forming the shim of ceramics, the aforementioned wear resistance and fatigue resistance are improved. Further, because the thermal expansion coefficient is decreased, it is possible to maintain a stabilized fuel injection timing, injection amount and the like despite a severe sliding. As a preferred embodiment of the shim material made of ceramics, a case in which ceramic is silicone nitride base ceramics, that is, whose main component is silicone nitride and/or SIALON. As described above, the shim is desired to have a high strength and hardness and its thermal expansion coefficient is desired to be small. Additionally, if it is used as a reciprocating mechanical part, it is desired to be of light weight. Therefore, it is desired to be made of silicone nitride base ceramics. Particularly if silicone nitride and/or SIALON of more than or equal to 80 weight % is contained and the three-point bending strength based on JIS R1601 is more than or equal to 700 MPa, it is preferable in viewpoint of durability.

In the cam roller system composed of a plural-mountain cam, wear by punching mainly occurs. Therefore, it is important to endure this to assure the service life against surface separation. From this viewpoint, particularly the porosity of the sliding surface is desired to be less than or equal to 2% in terms of area ratio on the sliding surface and the maximum porosity on the same surface is desired to be less than or equal to 10 µm.

In the combination of the shim and cam described above, even if the shim is mounted on the lifter without being fixed or bonded, or if as a means for bonding the shim to a metallic base, bonding (soldering or the like) or fitting (caulking, pressure-fit, shrinkage fit and the like) or a combination thereof is selected, the same operation and effect are provided.

Although as a mounting method for mounting the shim having the above structure to a shim mounting part, several methods can be picked up as shown in FIG. 5, as its main type, a loose mounting (FIG. 5a) in which the shim can be rotated or a fitting method such as caulking (FIG. 5b) is available. As a machining method for providing with the above-mentioned convex spherical face, a method in which a circular shim is rotated relative to its center line so as to surface-grind with a cup-shaped grinding wheel is desired. In this case, from viewpoint of cost it is preferable that this surface grinding is carried out by ultra finishing by pressure cutting.

BRIEF DESCRIPTION OF THE DRAWINGS

FIG. 8a and FIG. 8b are schematic diagrams showing wear amounts of the shim and cam of the embodiment.

FIG. 9 is a schematic diagram showing a wear amount of the shim mounting surface of the embodiment.

BEST MODE FOR CARRYING OUT THE INVENTION

Hereinafter, the present invention will be described regarding the examples.

EXAMPLE 1

Figure 7:
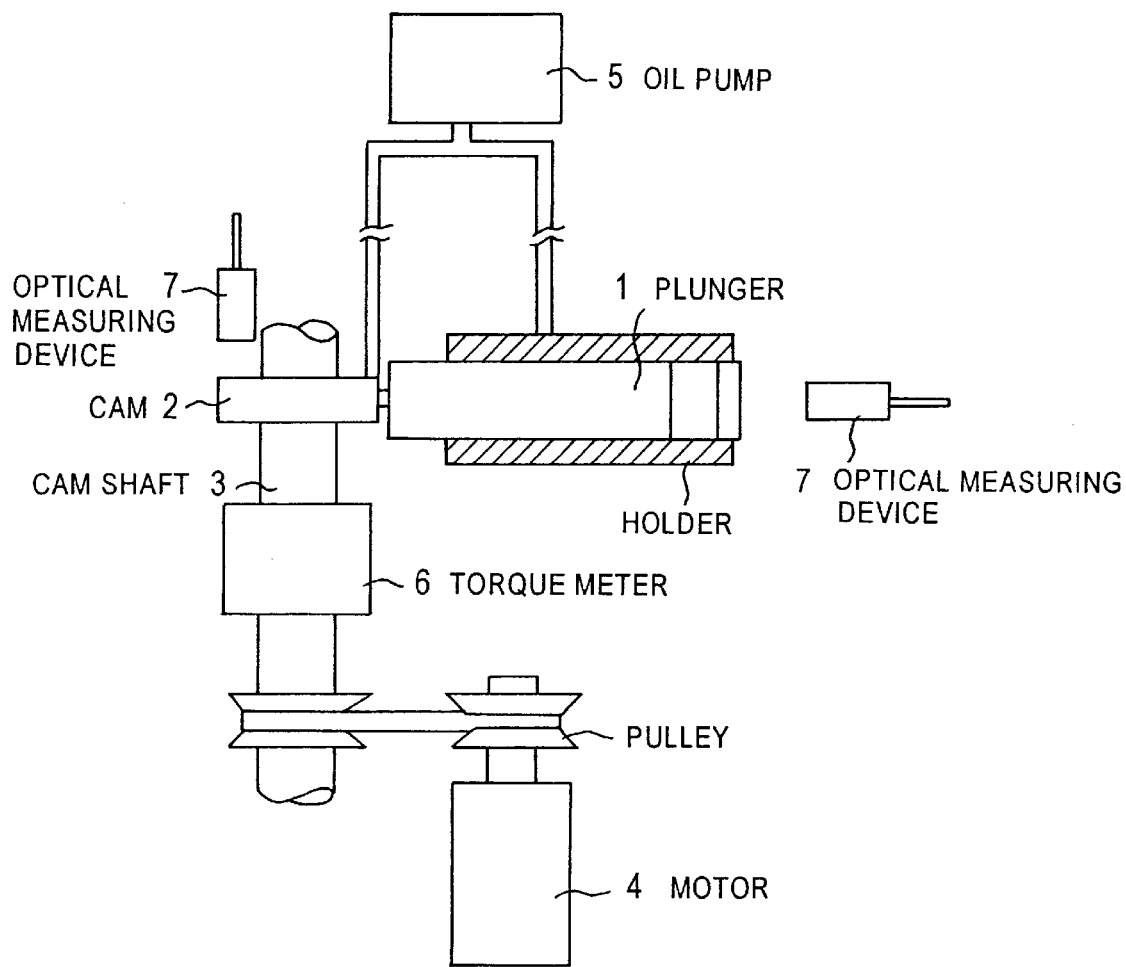
FIG. 7 is a schematic diagram of a test machine for use in an embodiment.
Figure 10:
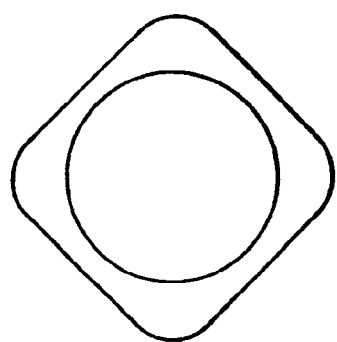
FIG. 10 is a front view of the cam mechanism having a plurality of cams.

A fuel pump test machine comprising a cam 2 having four mountains of a shape shown in FIG. 10 for reciprocating a plunger 1 shown in FIG. 7, a driving motor 4 for rotating a cam mechanism including a shim and the cam and a cam shaft 3 thereof, an oil pump 5 for supplying lubricant to the cam mechanism and a torque meter 6 for measuring a driving torque of the cam shaft 3. The cam for use here is made by chilled hardening the surface of an ordinary cast iron and then finishing the sliding surface to ten-point average surface roughness $R_z$ 3.2 µm by a predetermined machining. On the other hand, the conventional shim is made of SCM420 carburized quench hardening steel and finishing the sliding surface thereof to ten-point average surface roughness $R_z$ of 3.2 µm by a predetermined machining and then applying manganese phosphate salt film by lubrite treatment. Meanwhile, the outside diameter of the shim is 20 mm and thickness thereof is 2 mm.

On the other hand, the shim of the present invention is produced by a various combination of grinding the surface of marketed $Si_3N_4$ sintered body (JISR1601 based three-point bending strength=850 MPa), $Al_2O_3$ sintered body (same=350 MPa) or $ZrO_2$ sintered body (same=1200 MPa) with a diamond grinding wheel and lapping and polishing with diamond grit so that the surface thereof is finished to the ten-point average surface roughness shown in Table 1.

On the other hand, for a shim coated with ceramic or the like as a comparative example, the surface of the above-mentioned conventional steel shim material is finished to various surface roughnesses in terms of ten-point average surface roughness with a WA grinding stone. After that, diamond and DLC coating film of 1 μm in thickness and TiN, CrN coating film of 3 μm are provided on the surface according to a well-known physical evaporation method. Meanwhile, the same Table indicates Vickers hardness of the surface of each shim.

The aforementioned cam and shim were combined and mounted onto the aforementioned test machine. Then, the cam shaft was driven at 2500 rpm with a motor (lubricant temperature 80° C.) and a cam shaft driving torque was measured an hour after and 500 hours after the operation was started. The driving torque of each shim is indicated as a relative value in a condition that the driving torque when the conventional steel shim is used is regarded as 100%.

Figure 12C:
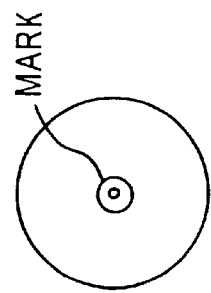
FIG. 12 is an explanatory diagram of a cam and a plunger for use in the embodiment.
Figure 12B:
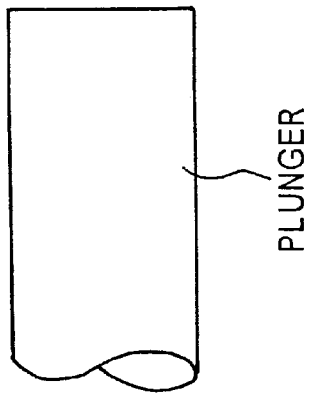
Figure 12A:
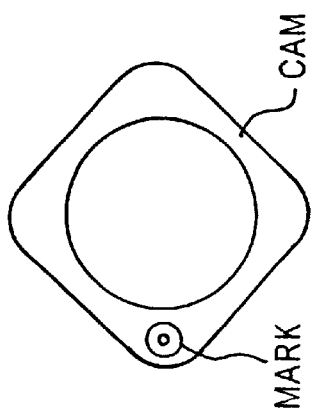
Figure 13:
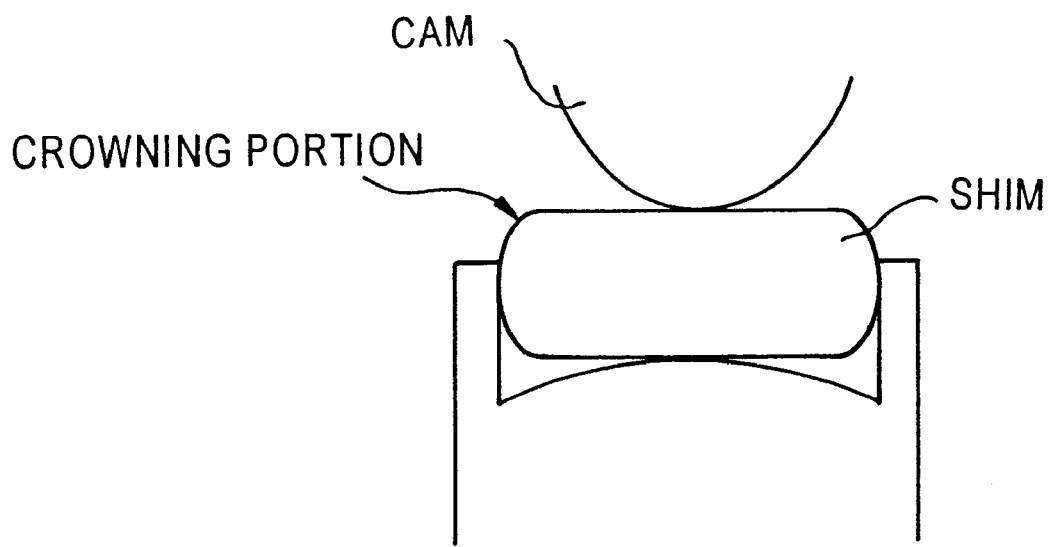
FIG. 13 is a schematic diagram of a crowning of a shim mounting surface of the present invention.

On the other hand, as shown in FIG. 12, a mark for measuring a rotation period was incised preliminarily and a time when this mark was passed was measured with an optical type measuring device 7. At the same time, the mark was incised on a top of a plunger and a time when these marks come nearest each other was measured with the optical type measuring device. A change of a difference of time between the former time and latter time was defined as a deviation of injection timing. A deviation of each shim was evaluated with a relative value in a condition that the deviation between an hour after and 500 hours after the operation the conventional steel shim with was started was regarded as 100%. It comes that the smaller this relative value is, the smaller the deviation of the injection timing with a time passage is, thereby indicating that the function of the fuel injection pump is stabilized.

Table 1 shows a result of the above operation.

TABLE 1

| Test piece No. | Shim material | Vickers hardness of shim surface | Surface roughness of shim Rz: μm | Driving torque (%) 1 hour after | Driving torque (%) 500 hours after | Deviation of injection timing (%) |
| --- | --- | --- | --- | --- | --- | --- |
| *1 | conventional product | 750 | 3.2 | 100 | 100 | 100 |
| *2 | $Si_3N_4$ | 1540 | 0.8 | 105 | 102 | 115 |
| 3 | $Si_3N_4$ | 1540 | 0.4 | 75 | 80 | 12 |
| 4 | $Si_3N_4$ | 1540 | 0.1 | 65 | 68 | 5 |
| 5 | $Si_3N_4$ | 1540 | 0.08 | 65 | 68 | 5 |
| 6 | $Si_3N_4$ | 1540 | 0.05 | 65 | 68 | 5 |
| *7 | CrN coating | 1210 | 0.4 | film released | — | — |
| 8 | $Al_2O_3$ | 2300 | 0.4 | 80 | 85 | 15 |
| 9 | $ZrO_2$ | 1250 | 0.4 | 80 | 83 | 17 |
| *10 | TiN coating | 1180 | 0.4 | 85 | film released | — |
| *11 | DLC coating | 2600 | 0.4 | film released | — | — |
| *12 | diamond coating | 6000 | 0.4 | film released | — | — |

*indicates a comparative example

As indicated above, it is apparent that reduction of friction work and a remarkable reduction of deviation of injection timing with a time passage are achieved by using a combination of the cam and shim according to the present invention.

EXAMPLE 2

Figure 1:
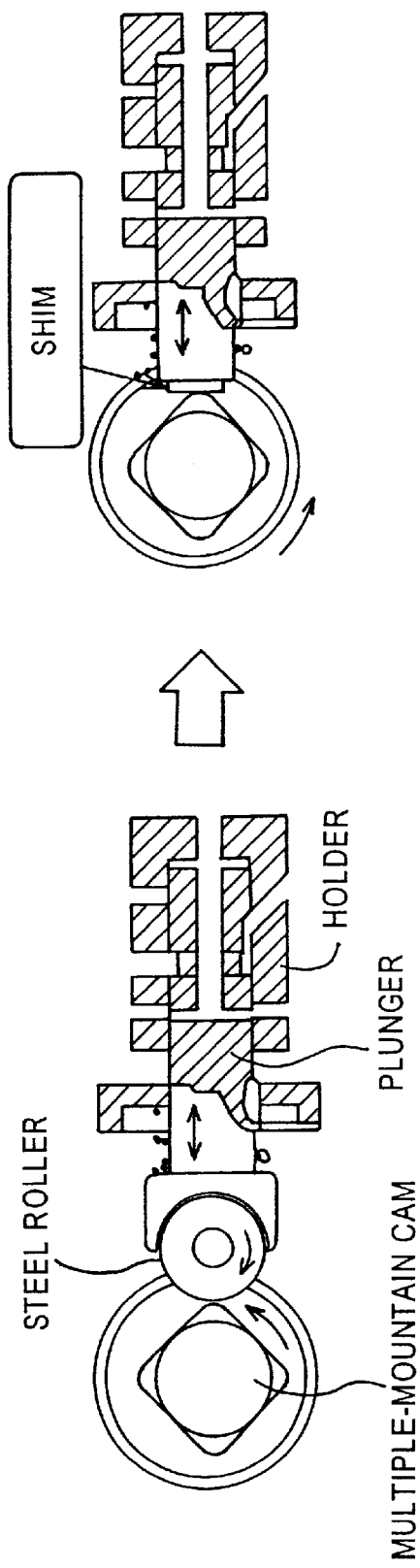
FIG. 1 is a schematic diagram showing a reciprocating system of rolling type and sliding type.
Figure 2A:
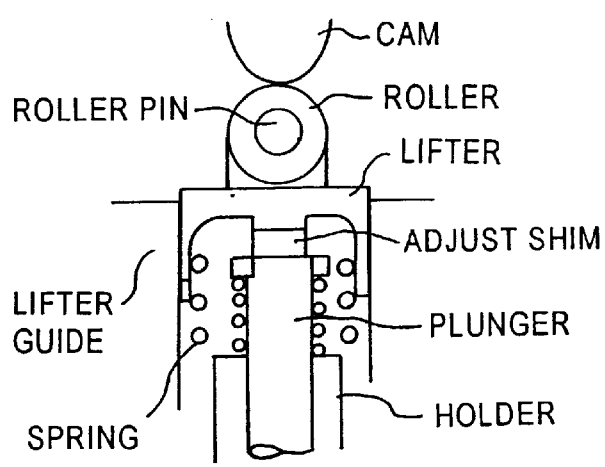
FIG. 2a and FIG. 2b are schematic diagrams showing an example of conventional roller or shim mechanism.
Figure 2B:
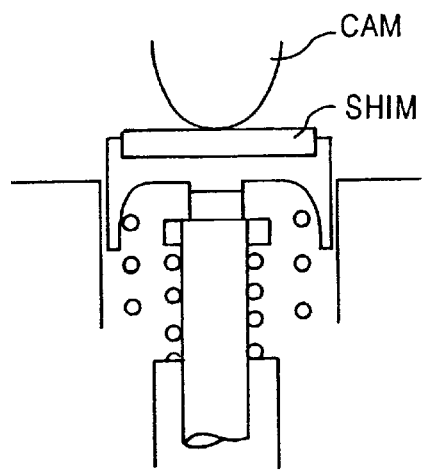
Figure 3:
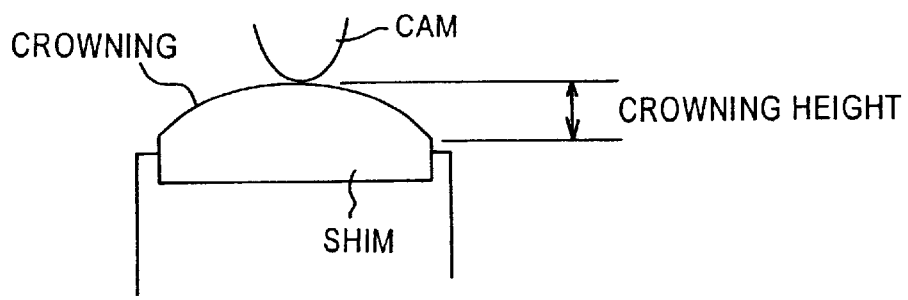
FIG. 3 is a schematic diagram showing an example of conventional shim mechanism with a crowning.
Figure 11:
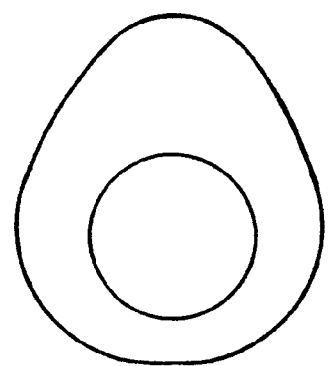
FIG. 11 is a front view of the cam mechanism having a single mountain.

The same test machine as the example 1 was used, and cam having a single mountain shown in FIG. 11 and the same cam as the example 1 were used (lubricant temperature 150° C.). The test machine was operated at 3000 rpm using the 4-mountain cam for 500 hours and using a single-mountain cam for 2,000 hours. The reciprocating frequency of a plunger was set to equal for each cam. The same evaluation as the example 1 was carried out. A shim in which a conventional steel was finished to surface roughness of 3.2 z was used as a reference for relative comparison (single mountain and 4-mountains). As the conventional steel, the ones whose surface roughness was changed as shown in FIG. 2 and FIG. 3, three kinds including $Si_3N_4$, CrN coating layer and DLC coating layer and ones having surface roughness shown in FIG. 3 were used.

TABLE 2

| test piece No. | Number of mountains of cam | Shim material | Surface roughness of shim Rz: μm | Driving torque (%) 1 hour after | Driving torque (%) 500 hours after | Deviation of injection timing (%) |
| --- | --- | --- | --- | --- | --- | --- |
| *1 | 4 | conventional product | 3.2 | 100 | 100 | 100 |
| *2 | 4 | conventional product | 0.2 | 98 | 100 | 100 |
| *3 | 4 | $Si_3N_4$ | 0.8 | 95 | 98 | 110 |
| 4 | 4 | $Si_3N_4$ | 0.2 | 70 | 72 | 15 |
| *5 | 4 | CrN coating | 0.2 | 80 | film separation | — |
| *6 | 4 | DLC coating | 0.2 | film separation | — | — |

*indicates a comparative example

TABLE 3

| test piece No. | Number of mountains of cam | Shim material | Surface roughness of shim Rz: μm | Driving torque (%) 4 hours after | Driving torque (%) 2000 hours after (single mountain) | Deviation of injection timing (%) |
| --- | --- | --- | --- | --- | --- | --- |
| *1 | single | conventional product | 3.2 | 100 | 100 | 100 |
| *2 | single | conventional product | 0.2 | 72 | 75 | 100 |
| *3 | single | $Si_3N_4$ | 0.8 | 95 | 100 | 105 |
| *4 | single | CrN coating | 0.2 | 72 | 78 | 100 |
| *5 | single | DLC coating | 0.2 | 72 | 78 | 100 |

*indicates a comparative example

As indicated above, it is apparent that a remarkable reduction of deviation with a time passage of injection timing is achieved by combination of the cam and shim according to the present invention. Further, it has been made apparent that there is no problem to be solved by the present invention about a cam having a single mountain.

EXAMPLE 3

Like the example 1, a fuel pump test machine shown in FIG. 7 was produced. The same cam as the example 1 was prepared. The outside diameter of the shim was 20 mm and the thickness thereof was 2 mm.

Figure 4:
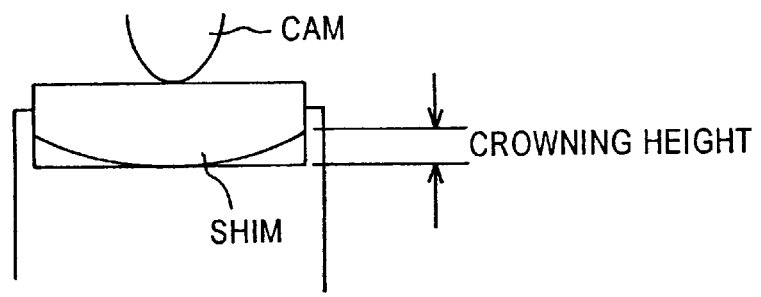
FIG. 4 is a schematic diagram of a crowning of a shim mounting surface of the present invention.
Figure 5A:
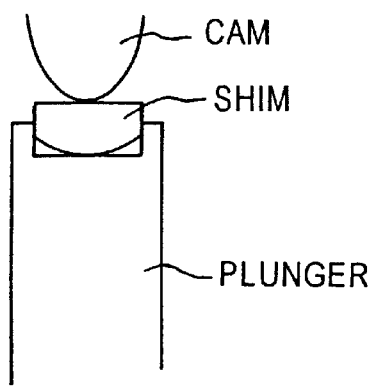
FIG. 5a and FIG. 5b are schematic diagrams showing an example of shim mounting method of the present invention.
Figure 5B:
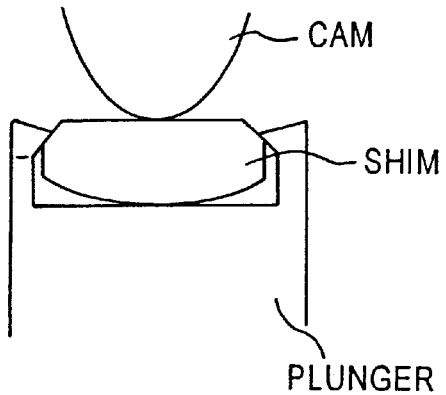

On the other hand, the conventional shim material was SCM420 carburized quench hardening steel, finished to the same as the example 1 and coated with manganese phosphate film. As the shim of the present invention, the surfaces of the marketed $Si_3N_4$ sintered body and $Al_2O_3$ sintered body as the example 1 were finished in the same manner as the example 1 so as to have the ten-point average surface roughness shown in FIG. 4.

Figure 6:
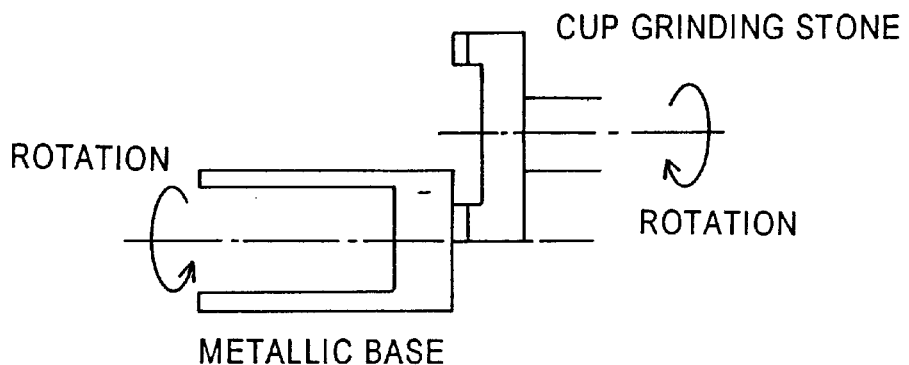
FIG. 6 is a schematic diagram showing an example of a processing method for the crowning of a shim of the present invention.

On the other hand, as for the shim having the coating film, the surface of the above conventional steel shim was finished to various surface roughnesses indicated by Table 1 in terms of the ten-point average surface roughness with a WA grinding wheel. After that, TiN, CrN coating film having a thickness of 3 μm was applied to the sliding surface relative to the cam by physical evaporation method. As for a provision of a shape of crowning shape, the sliding surface of each cam and a surface of the shim (contact surface called in Table 4) making a contact with a plunger on which the shim is mounted were provided with crowning shape according to a processing method shown in FIG. 6 and the surface roughness of each surface is shown in Table 4.

The above combination of the cam and shim was mounted on the test machine shown in FIG. 7 and the cam shaft was operated at 2500 rpm by a motor (lubricant temperature 80° C.) and the wear amounts of the cam and shim were measured 200 hours and 500 hours after the operation was started. To confirm the wear amounts of the shim and cam, the length W shown in FIG. 8 was measured before and after the test. The sliding surfaces of the shim and cam as the test piece of the present invention were finished to 2–3 μm in terms of flatness degree.

The reason why the evaluated wear amounts of the shim and cam of the test pieces 10, 11 after 500 hours are large is that the coating film was separated. On the other hand, Table 5 indicates the processing cost for the sliding surface and contact surface of the shim and cam of the test pieces 4–9 of Table 4 in terms of a relative value with the test piece 4 regarded as 1.

TABLE 5

| Test piece No. | processing cost |
| --- | --- |
| 4 | 1 |
| 5 | 1.5 |
| 6 | 4.5 |
| 7 | 1.8 |
| 8 | 1.3 |
| 9 | 1.2 |

As described above, it is apparent that the wear resistances of the shim and cam have been improved by using the shim of the present invention so as to ensure the durability as the part and that the processing cost can be largely reduced so that lower cost parts can be provided.

EXAMPLE 4

Using the same test machine as the example 1, $Si_3N_4$ of the example 3 was subjected to the same finish work as the example 3 so as to have a crowning height and surface roughness shown in Table 6. Then, the same evaluation as the example 3 was carried out and its result is shown in the same Table. A wear amount generated in a contact surface relative to the shim due to sliding between a base material and shim was measured by measuring the length w before and after a test shown in FIG. 9. A measurement result 500 hours after is shown in the same Table.

TABLE 4 shim crowning height/surface roughness

| test piece No. | Shim material | sliding surface relative to cam | | contact surface | | shim wear amount (μm) | | cam wear amount (μm) | |
| --- | --- | --- | --- | --- | --- | --- | --- | --- | --- |
| | | height | roughness: Rz | height | roughness: Rz | 200 hours | 500 hours | 200 hours | 500 hours |
| *1 | conventional product | none | 3.2 | none | 3.2 | 110 | 220 | 90 | 140 |
| *2 | conventional product | 10 | 3.2 | none | 3.2 | 80 | 160 | 60 | 90 |
| *3 | conventional product | none | 3.2 | 10 | 3.2 | 70 | 150 | 50 | 80 |
| *4 | $Si_3N_4$ | none | 0.8 | None | 0.8 | 20 | 30 | 180 | 300 |
| 5 | $Si_3N_4$ | none | 0.2 | 10 | 0.8 | 15 | 20 | 35 | 60 |
| *6 | $Si_3N_4$ | 10 | 0.2 | none | 0.8 | 15 | 25 | 50 | 70 |
| 7 | $Si_3N_4$ | none | 0.2 | 25 | 0.8 | 10 | 15 | 20 | 30 |
| 8 | $Al_2O_3$ | none | 0.2 | 10 | 0.8 | 20 | 30 | 40 | 65 |
| 9 | $ZrO_2$ | none | 0.2 | 10 | 0.8 | 25 | 40 | 35 | 60 |
| 10 | CrN coating | none | 0.2 | 10 | 0.8 | 20 | 80 | 40 | 80 |
| 11 | TiN coating | none | 0.2 | 10 | 0.8 | 20 | 90 | 40 | 80 |

(*indicates a comparative example)

TABLE 6

| test piece No. | shim crowning height/surface roughness | | | | shim wear amount (μm) | | cam wear amount (μm) | | wear amount of contact member |
|---|---|---|---|---|---|---|---|---|---|
| | sliding surface relative to cam | | contact surface | | | | | | |
| | height | roughness: Rz | Height | roughness: Rz | 200 hours | 500 hours | 200 hours | 500 hours | 500 hours |
| *1 | none | 0.6 | 10 | 0.8 | 20 | 25 | 150 | 240 | 10 |
| 2 | none | 0.4 | 10 | 0.8 | 15 | 20 | 40 | 60 | 10 |
| 3 | none | 0.1 | 10 | 0.8 | 15 | 20 | 10 | 15 | 10 |
| *4 | none | 0.05 | 10 | 0.8 | 15 | 20 | 10 | 15 | 10 |
| 5 | none | 0.2 | 10 | 3.2 | 15 | 20 | 10 | 15 | 15 |
| 6 | none | 0.2 | 10 | 6.4 | 15 | 20 | 10 | 15 | 20 |
| 7 | none | 0.2 | 10 | 8.0 | 15 | 20 | 10 | 15 | 40 |
| 8 | none | 0.2 | 5 | 0.8 | 10 | 15 | 20 | 30 | 10 |
| 9 | none | 0.2 | 3 | 0.8 | 10 | 15 | 25 | 35 | 10 |
| 10 | none | 0.2 | 30 | 0.8 | 10 | 15 | 10 | 12 | 10 |
| 11 | none | 0.2 | 50 | 0.8 | 15 | 20 | 20 | 30 | 10 |
| 12 | none | 0.2 | 80 | 0.8 | 20 | 25 | 60 | 90 | 10 |

(*indicates a comparative example)

On the other hand, Table 7 shows the processing cost for the sliding surface and contact surface of all the shims and cams shown in Table 6 in terms of a relative value with the test piece as 1.

TABLE 7

| Test piece No. | Processing cost |
|---|---|
| 1 | 1 |
| 2 | 1.3 |
| 3 | 1.8 |
| 4 | 3.0 |
| 5 | 1 |
| 6 | 0.8 |
| 7 | 0.7 |
| 8 | 1.5 |
| 9 | 1.8 |
| 10 | 2.5 |

As described above, it is apparent that the wear resistance of the shim and cam have been improved by using the shim of the present invention so as to ensure the durability as the part and that the processing cost can be largely reduced so that lower cost parts can be provided.

EXAMPLES 5

The test pieces 8 of the example 4 were finished so that the flatness of the sliding surface relative to the cam was as shown in Table 8 and then evaluated using the same test machine as the example 1 in the same way as the example 3. Its evaluation result is shown in the same Table.

TABLE 8

| test piece No. | flatness of sliding surface relative to cam (μm) | Shim wear amount (μm) | | cam wear amount (μm) | |
|---|---|---|---|---|---|
| | | 200 hours | 500 hours | 200 hours | 500 hours |
| 1 | 3.0 | 10 | 15 | 10 | 12 |
| 2 | 5.0 | 10 | 15 | 15 | 20 |
| 3 | 7.0 | 15 | 20 | 30 | 45 |
| 4 | 0.5 | 10 | 15 | 10 | 12 |
| 5 | 0.1 | 10 | 15 | 10 | 12 |

On the other hand, Table 9 shows the processing cost for the sliding surface and contact surface of all the shims and cams shown in Table 8 in terms of a relative value with the test piece 1 as 1.

TABLE 9

| Test piece No. | Processing cost |
|---|---|
| 1 | 1 |
| 2 | 1 |
| 3 | 1 |
| 4 | 1.2 |
| 5 | 2.0 |

As described above, it is apparent that the wear resistances of the shim and cam have been improved by using the shim of the present invention so as to ensure the durability as the part and that the processing cost can be largely reduced so that lower cost parts can be provided.

INDUSTRIAL APPLICABILITY

By applying a combination of the shim and cam of the present invention to a fuel pressure feeding pump driving mechanism, the wear work between the cam and shim can be reduced remarkably and a low cost shim can be provided.

Further it is apparent that, by using a combination of the cam and shim, the cam mechanism having a plurality of cam mountains is capable of achieving a reduction of wear work and a remarkable reduction of deviation of injection timing with a time passage as compared to a case in which only the shim of the present invention is applied to a cam mechanism having a single mountain. As regards the coating film of the ceramic and the like, although no film separation occurs in a single mountain cam so that it is usable, film separation occurs in a combination with plural-mountain cam of the present invention so that a sufficient durability cannot be obtained. As a result, the inventive step of the present invention has been made evident.

What is claimed is:

1. A combination of a shim and a cam for use in a reciprocating mechanical system wherein the surface roughness of a first sliding surface of a shim sliding relative to a cam is 0.07–0.4 μm in terms of ten-point average surface roughness Rz, the surface hardness of said surface is higher than the surface hardness of the cam and said cam has a plurality of cam mountains.

2. A combination of a shim and a cam as claimed in claim 1 wherein a sliding surface of the shim surface, relative to a part other than the cam is flat.

3. A combination of a shim and a cam as claimed in claim 1 wherein a second sliding surface of the shim sliding relative to a part other than the cam is a convex-shaped spherical face, referred to as a "crowning".

4. A combination of a shim and a cam as claimed in claim 3 wherein a flatness of the first sliding surface of the shim is 0.5–5 μm and a maximum height of the convex-shaped spherical face crowning is 5–50 μm.

5. A combination of a shim and a cam as claimed in claim 1 wherein the shim is mounted on a lifter and the surface roughness of the contact surface relative to the lifter is 0.6–6.4 μm in terms of ten-point average surface roughness Rz.

6. A combination of a shim and a cam as claimed in claim 1 wherein the surface hardness of the sliding surface of the shim relative to the cam is 1000 or more in terms of Vickers hardness.

7. A combination of a shim and a cam as claimed in claim 6 wherein the shim is made of ceramics.

8. A combination of a shim and a cam as claimed in claim 7 wherein ceramics is made of silicone nitride base ceramics.

9. A combination of a shim and a cam as claimed in claim 3 wherein a coating layer ceramics, diamond or diamond like carbon is provided on the surface of the shim.

* * * * *